Feb. 13, 1951     P. L. BORN ET AL     2,541,569
LIQUEFYING AND REGASIFYING NATURAL GASES
Filed April 2, 1945

Fig. 1

Table I

EFFECT OF REMOVAL OF HEAVY HYDROCARBONS UPON QUALITY OF LIQUEFIED NATURAL GAS AS STORED AND AFTER ONE YEAR IN STORAGE, ALSO EFFECT UPON QUANTITY OF DILUENT AIR REQUIRED

| Constituent | Symbol | (a) | (b) | (c) | (d) | (e) | (f) | (g) | (h) | (i) |
|---|---|---|---|---|---|---|---|---|---|---|
| | | Analysis - % by volume | | | | | | Dry basis | | |
| Carbon Dioxide | $CO_2$ | 0.0 | 0.0 | 0.0 | 0.0 | 0.0 | 0.0 | 0.0 | 0.0 | 0.0 |
| Oxygen | $O_2$ | 0.0 | 0.0 | 0.0 | 2.2 | 5.2 | 0.0 | 0.0 | 1.3 | 2.2 |
| Methane | $CH_4$ | 80.3 | 86.2 | 48.9 | 77.0 | 36.9 | 94.2 | 80.8 | 88.5 | 72.3 |
| Ethane | $C_2H_6$ | 5.1 | 7.4 | 27.4 | 6.6 | 20.7 | 4.7 | 17.4 | 4.4 | 15.6 |
| Propane | $C_3H_8$ | 3.7 | 4.7 | 17.4 | 4.2 | 13.1 | 0.5 | 1.8 | 0.5 | 1.6 |
| Iso-Butane | $C_4H_{10}$ | 0.4 | 0.5 | 1.9 | 0.4 | 1.4 | 0.0 | 0.0 | 0.0 | 0.0 |
| Normal Butane | $C_4H_{10}$ | 0.9 | 1.0 | 3.7 | 0.9 | 2.8 | 0.0 | 0.0 | 0.0 | 0.0 |
| Pentane | $C_5H_{12}$ | 0.1 | 0.2 | 0.7 | 0.2 | 0.5 | 0.0 | 0.0 | 0.0 | 0.0 |
| Nitrogen | $N_2$ | 9.5 | 0.0 | 0.3 | 8.5 | 19.4 | 0.6 | 0.0 | 5.3 | 8.3 |
| TOTAL | | 100.0 | 100.0 | 100.0 | 100.0 | 100.0 | 100.0 | 100.0 | 100.0 | 100.0 |
| Burner input - % of normal | | 100.0 | 114.96 | 133.15 | 100.0 | 100.0 | 108.65 | 114.67 | 100.0 | 100.0 |
| Per cent air which must be added as diluent to reduce burner input to normal | | 0.0 | 10.70 | 24.56 | 0.0 | 0.0 | 6.02 | 10.46 | 0.0 | 0.0 |
| BTU/CF Dry Basis 60° - 30" | | 1042.0 | 1186.3 | 1653.8 | 1059.4 | 1247.7 | 1051.6 | 1177.1 | 988.3 | 1054.0 |
| BTU/CF Saturated 60° - 30" | | 1024.0 | 1165.8 | 1625.2 | 1041.1 | 1226.1 | 1033.4 | 1156.8 | 971.2 | 1035.8 |
| Specific Gravity Dry Basis (Air = 1.000) | | 0.678 | 0.665 | 0.963 | 0.701 | 0.972 | 0.585 | 0.658 | 0.610 | 0.694 |

(a) Natural Gas "I" Liquefied According to Prior Art Process; $N_2$ and some $CH_4$ Removed
(b) Natural Gas "I" Liquefied According to Prior Art Process; After One Year in Storage
(c) Natural Gas "I" Liquefied According to Prior Art Process; Plus 10.7% Air
(d) Natural Gas "I" Liquefied According to New Process; After One Year in Storage; Plus 24.56% Air
(e) Natural Gas "I" Liquefied According to New Process; $N_2$ some $CH_4$ and Major Portion of Heavier Hydrocarbons Removed;
(f) Natural Gas "I" Liquefied According to New Process; $N_2$ some $CH_4$ and Major Portion of Heavier Hydrocarbons Removed;
(g) Natural Gas "I" Liquefied According to New Process; $N_2$ some $CH_4$ and Major Portion of Heavier Hydrocarbons Removed;
   One Year in Storage
(h) Natural Gas "I" Liquefied According to New Process; $N_2$ some $CH_4$ and Major Portion of Heavier Hydrocarbons Removed;
   6.02% Air Added
(i) Natural Gas "I" Liquefied According to New Process; $N_2$ some $CH_4$ and Major Portion of Heavier Hydrocarbons Removed;
   One Year in Storage; 10.46% Air Added INVENTORS.
Paul L. Born,
Daniel V. Meiller,
BY
*[signature]*
ATTYS

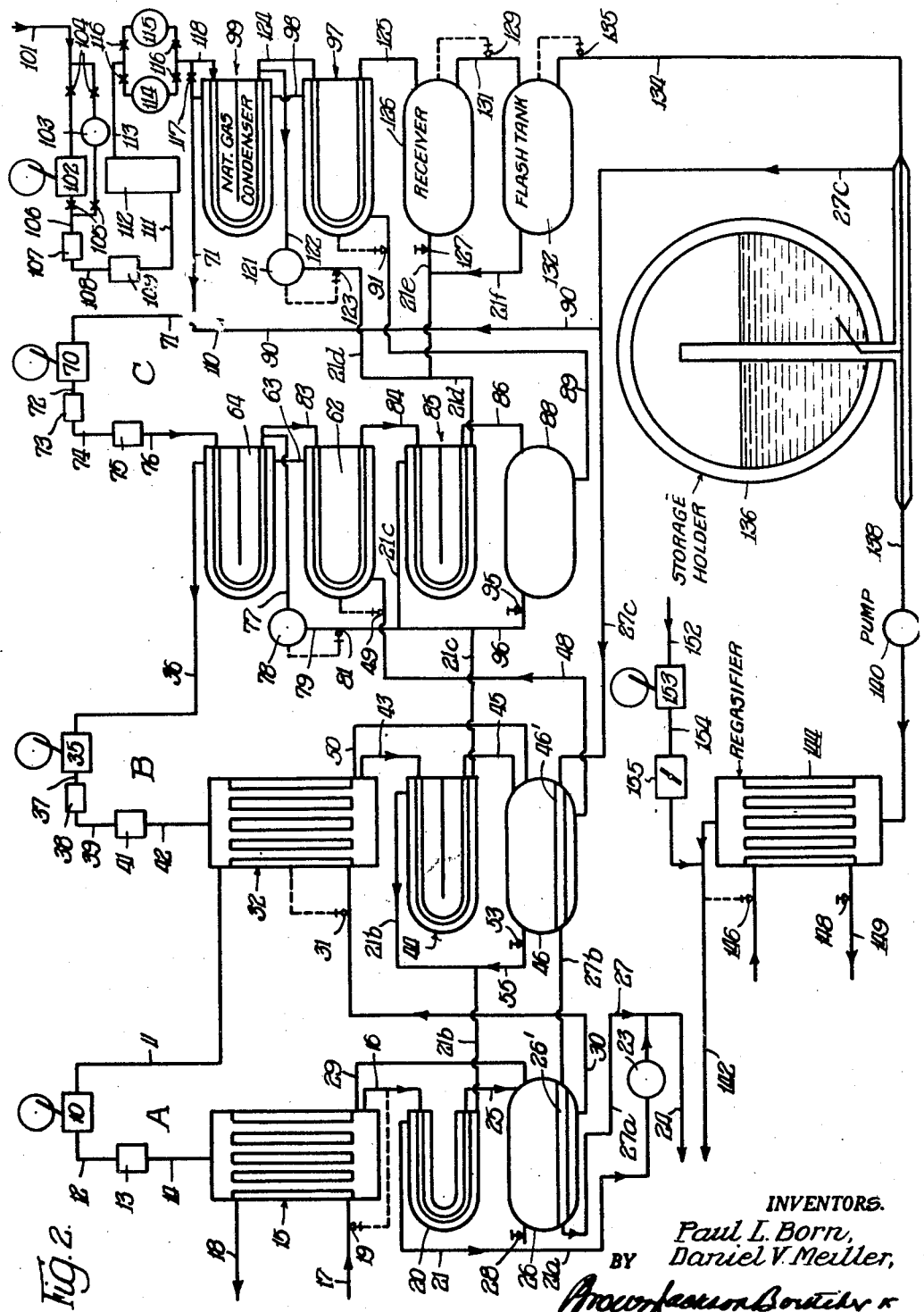

Patented Feb. 13, 1951

2,541,569

UNITED STATES PATENT OFFICE 2,541,569

LIQUEFYING AND REGASIFYING NATURAL GASES

Paul L. Born, Wilmette, and Daniel V. Meiller, Maywood, Ill.

Application April 2, 1945, Serial No. 586,250

4 Claims. (Cl. 62—122)

The present invention relates to an improved method of and apparatus for liquefying, storing and regasifying a portion of natural gas to serve as a substitute fuel during times of interruption or diminution of normal supply.

The primary purpose of the invention is to prepare a substitute fuel from natural gas during periods when the supply of such gas is available in the gas system, and to store said substitute fuel in the liquid state until an emergency causes partial or total interruption of the normal supply, at which time the stored substitute fuel may be regasified and used to replace or supplement the normal supply for the duration of the emergency.

In order that the regasified substitute fuel may satisfactorily replace the normal supply, it must have combustion characteristics similar to those of the original natural gas, and, furthermore, the heat input to gas burning equipment must be satisfactory. That is to say, during any period of emergency affecting the normal gas supply, the stored liquid, upon regasification, may be sent out or distributed essentially unmixed with the normal gas distributed, and therefore the regasified substitute fuel must have combustion or burning characteristics substantially the same as the gas normally distributed. These combustion or burning characteristics embrace such factors as (1) heating value or B. t. u. value, (2) specific gravity, and (3) rate of flame propagation. Prior methods and apparatus heretofore known to us for liquefying and regasifying natural gas have not been adequate to meet these requirements which arise in emergency situations, and more particularly for the reasons which we shall now point out.

It is commonly accepted theory, practice and fact, that to successfully liquefy natural gas on a commercial scale, it is necesary to "bleed off" or remove from the cycle the uncondensed portions of the nitrogen and other components which have lower boiling points than methane. This is because an accumulation of such constituents in the final heat exchangers would stop the liquefaction process.

Since these constituents are either non-combustible or are of low heating value, the removal of such constituents changes the calorific value, specific gravity, and combustion characteristics of the remainder. By way of illustration, assume a natural gas normally having typical characteristics substantially as follows (hereinafter referred to as natural gas "X"):

| Constituent | Symbol | Per Cent by volume |
|---|---|---|
| Carbon Dioxide | $CO_2$ | 0.0 |
| Oxygen | $O_2$ | 0.0 |
| Methane | $CH_4$ | 80.3 |
| Ethane | $C_2H_6$ | 5.1 |
| Propane | $C_3H_8$ | 3.7 |
| Iso-Butane | $C_4H_{10}$ | 0.4 |
| Normal Butane | $C_4H_{10}$ | 0.9 |
| Pentane | $C_5H_{12}$ | 0.1 |
| Nitrogen | $N_2$ | 9.5 |
| Total | | 100.0 |

Specific gravity, dry basis (air=1.0) =0.678.
Heating (calorific) value, dry basis—(30″ mercury, 60° F.) =1042 British thermal units per cubic foot.
Heating (calorific) value, saturated (30″ mercury, 60° F.) =1024 British thermal units per cubic foot. Heat input to a gas appliance=normal or 100%.

If the above gas be liquefied according to a prior art process where the nitrogen and a portion of the methane are removed from the cycle, then the liquefied gas, when regasified, will have characteristics substantially as follows:

| Constituent | Symbol | Per Cent by volume |
|---|---|---|
| Carbon Dioxide | $CO_2$ | 0.0 |
| Oxygen | $O_2$ | 0.0 |
| Methane | $CH_4$ | 86.2 |
| Ethane | $C_2H_6$ | 7.4 |
| Propane | $C_3H_8$ | 4.7 |
| Iso-Butane | $C_4H_{10}$ | .5 |
| Normal Butane | $C_4H_{10}$ | 1.0 |
| Pentane | $C_5H_{12}$ | .2 |
| Nitrogen | $N_2$ | 0.0 |
| Total | | 100.0 |

Specific gravity, dry basis (air=1.0) =0.665.
Heating (calorific) value, dry basis (30″—60°) =1186.3 British thermal units per cubic foot.
Heating (calorific) value, saturated (30″—60°) = 1165.8 British thermal units per cubic foot.
Heat input to a gas appliance=115% of normal.

Air, which may be added (as a diluent) to the above regasified liquid natural gas ("X") to reduce the burner input to normal, amounts to 10.7% (by volume) of the mixture of regasified gas and air. Products of combustion or other gases may be used as a diluent in lieu of air. References to percentages for dilution of gas by gas, shall hereinafter be with reference to volume percentages.

After the addition of 10.7% of air, the mixture will have characteristics substantially as follows:

| Analysis | Symbol | Percent by volume |
|---|---|---|
| Carbon Dioxide | $CO_2$ | 0.0 |
| Oxygen | $O_2$ | 2.2 |
| Methane | $CH_4$ | 77.0 |
| Ethane | $C_2H_6$ | 6.6 |
| Propane | $C_3H_8$ | 4.2 |
| Iso-Butane i | $C_4H_{10}$ | 0.4 |
| Normal Butane n | $C_4H_{10}$ | 0.9 |
| Pentane | $C_5H_{12}$ | 0.2 |
| Nitrogen | $N_2$ | 8.5 |
| Total | | 100.00 |

Specific gravity of the gas-air mixture dry basis (air=1.0)=0.701.
Heating (calorific) value, dry basis—(30″—60°)=1059.4 British thermal units per cubic foot.
Heating (calorific) value, value, saturated (30″—60°)=1041.1 British thermal units per cubic foot.
Heat input to a gas appliance=100% of normal.

From the above analyses and calculated characteristics, it is obvious that this liquefied natural gas "X," as put into storage, needs to be diluted with approximately 10.7% of air.

However, as the liquid gas stands in storage, a continual evaporation takes place, due to heat infiltration. The gas evaporated consists almost entirely of methane by reason of the low boiling point of methane as compared to the boiling points of the other hydrocarbons. As the methane evaporates, leaving behind the hydrocarbons of higher molecular weight, the analysis and characteristics of the stored liquid will undergo continuous change. In commercial liquefaction of natural gas, it has been the practice to store the liquid gas in containers holding approximately 50,000,000 cubic feet (measured as a gas at 30″—60°) each and of such construction that the evaporation amounts to approximately 100,000 cubic feet of gas per day. The characteristics of liquefied natural gas "X" (when regasified) after one year in storage are shown in column (c) of accompanying Table I. In Table I, column (a) shows the volume percentage of the different constituents of a typical natural gas hereinbefore referred to as natural gas "X." Column (b) shows the constituent percentages and other characteristics of natural gas "X" after this gas has been liquefied according to the aforementioned prior art process wherein $N_2$ plus some $CH_4$ are removed. Column (c) shows the same after one year in storage. Column (d) shows the liquefied natural gas of column (b) plus the addition of 10.70% air. Column (e) shows the liquefied natural gas of column (b) after one year in storage plus the addition of 24.56% air. Columns (f) to (i) inclusive have reference to constituents, characteristics etc. of natural gas "X" liquefied according to the improved process herein disclosed, as will be later described.

It will be seen from this Table I that as time in storage increases, the percentage of methane decreases, the percentages of other constituents increase and the quantity of diluent required increases. This results in a very unsatisfactory condition because as shown on Table I, the diluent required upon regasification increased from approximately 10% in the case of the freshly stored gas to approximately 25% in the case of gas stored for one year. This wide range in diluent required is undesirable because of the heavy investment in diluent compressors and because of the possibility of serious or dangerous operating errors in the mixing of diluent and regasified gas particularly when changing the source of regasified gas from one storage container to another, since the characteristics of the regasified gases from the two containers may vary widely, thereby requiring widely differing amounts of diluent; furthermore mixtures of diluent and regasified liquid rich in the higher hydrocarbons, i. e. butane, propane, result in unsatisfactory performance when burned by equipment designed for and adjusted for normal use with natural gas.

To obviate the above described difficulties and to make the process of liquefaction, etc., practical for extended periods of storage, which are required for emergency use as contrasted with peak load usage it is necessary that the stored liquid remain essentially or substantially unchanged as the length of time in storage increases, since a change in the composition of the stored liquid changes combustion characteristics of the regasified fuel. This desired condition of having the stored liquid remain substantially unchanged as the length of time in the storage increases is made possible by storing essentially or substantially a single compound.

Our invention has as its principal method of accomplishing this objective the storage of a liquid composed almost entirely of the methane portion of the natural gas. In the preferred practice of our invention, the major portion of the hydrocarbons of higher molecular weight than ethane are first removed from the system, by condensation or absorption leaving largely methane, ethane and nitrogen in the system, following which the balance is liquefied and stored except about one-third of the nitrogen and an equal amount of methane which are vented. It will be noted by reference to accompanying Table I, columns (f) (g) (h) and (i), that the gas liquefied by our process is very high in methane content (approximately 95%) and that even after one year in storage the methane content remains in excess of 80%. By reason of this comparative stability of characteristics and high methane content, the diluent required is low and does not increase greatly with time of storage. As shown by Table I, the increment increase in diluent (in per cent) required between gas as initially stored (column b) and after one year's storage (column c) is, in the case of the prior art processes, three (3) times as great as the increment increase in the case of gas liquefied by our process; also the total diluent required after one year is 2½ times as great for the gas liquefied by the prior art process as for gas liquefied by our process. Since the diluent required for substitute fuel liquefied by our process varies within rather narrow limits, the possibilities of serious operating errors in mixing are minimized. Where economic and operating conditions warrant it, our process can, at the discretion of the operator, be made to yield a higher percentage of methane than is shown in Table I.

Another object of the invention is to provide an improved arrangement by which the relatively low temperatures of the removed heavier hydrocarbons (i. e. the ethane, propane, butanes and pentane) and the relatively low temperatures of the removed nitrogen and methane are effectively utilized for cooling purposes in the multiple stages of the cascade system of refrigeration.

Another object of the invention is to provide an improved arrangement by which the relatively low temperatures of the gases evaporating from the surface of the liquefied final product in the storage holder are effectively utilized for retaining the refrigerants in two or more stages of the cascade system in liquid condition at low enough pressures for safe storage while the refrigerating compressors are shut down.

Numerous other objects, features and advantages of the system will be apparent from the following detailed description of one preferred method of and one preferred apparatus for carrying the invention into effect. In the accompanying drawings:

Figure 1 of the drawings illustrates the above described Table I, and

Figure 2 of the drawings illustrates one preferred form of the apparatus in diagrammatic form.

In the following description, we frequently refer to certain pressures and temperatures in rather specific values in order to make a complete and thorough disclosure to those skilled in the art, but we wish it to be understood that these pressures and temperatures are illustrative or preferred values and are not to be considered as limitative of the invention.

The preferred system of liquefaction herein disclosed is a cascade system wherein heat is elevated by means of mechanical power through several stages from low temperatures to high temperatures. It is obvious that heat must flow from a level of −260° F., which is the temperature of liquid natural gas, to a higher temperature in the range of 80° F., which is a typical temperature obtainable with water in an ammonia condenser on a warm summer day. The system preferably employs three stages of refrigeration, designated A, B, and C in their entireties.

The first stage of refrigeration A in this cascade system is obtained by liquefying ammonia or any other refrigerant of that class by the performance of conventional refrigerating methods. As shown at the left hand side of the drawing, ammonia compressor 10 pumps gaseous ammonia from intake line 11 at approximately 18 pounds per square inch absolute pressure (hereinafter abbreviated as p. s. i. a.). The intake pressure of stage A and subsequent stages B and C are controlled at 18 p. s. i. a. for two reasons. First, to minimize the possibility of leakage in or out of stuffing boxes. Second, to strike a mean between pressures lower which would favor the refrigerating process and pressures higher which would favor compressor intake conditions. The outlet side of the ammonia compressor 10 discharges to line 12 at approximately 150 p. s. i. a., this line connecting to a conventional oil separator 13. From this oil separator a line 14 extends to the tubes of an ammonia condenser 15. The ammonia gas is condensed to the liquid phase in its passage through the tubes of condenser 15, and this liquid ammonia leaves the condenser by way of line 16. Cooling water enters the chamber area around the tubes of condenser 15 through water inlet pipe 17, and this water leaves the cooling chamber through pipe 18. An automatic control valve 19 is interposed in the water inlet pipe 17 for controlling the rate of flow of the water through the condenser, this valve 19 being thermostatically controlled by having its thermally responsive bulb immersed in the ammonia outlet line 16 leading from the condensing tubes of condenser 15. The liquid ammonia is conducted through line 16 to the tubes of a subcooler 20 where the liquid ammonia is further cooled by cold gases conducted into the chamber of subcooler 20 from a subcooler cooling line 21. This subcooler cooling line 21 receives the heavier hydrocarbons which have been condensed out of the natural gas and also receives the vent and flash gases which have been separated from the natural gas and conducts these separated constituents as a cooling medium through three subcoolers indicated at 20, 44, and 85, which are interposed in the three stages of refrigeration A, B, and C. The outlet leading from the chamber area of subcooler 20 connects through section 21a of cooling line 21 with a governor or regulating valve 23, which in turn is connected through disposal line 24 with a disposal system where the gases are consumed in internal combustion engines, furnaces, or otherwise disposed of in any desired manner. Referring again to the ammonia cycle of this first stage A, the liquid ammonia, and some gases, leave the tubes of the subcooler 20 by line 25 and pass to a receiver 26, where further subcooling is accomplished by cold gases which are caused to pass through subcooling tubes 26' disposed within the receiver 26. These cold gases passing through the tubes 26' are supplied through a receiver cooling line 27 which leads from the evaporating area of the storage holder, as will be hereinafter described. The discharge ends of the tubes 26' connect through section 27a of receiver cooling line 27 with waste pipe 24, which discharges to the aforementioned disposal system. Uncondensed gases collecting within the chamber space of receiver 26 may be vented therefrom through valve 28. Equalizer line 29 from receiver 26 to condenser 15 prevents gas accumulation in receiver 26 which would impede liquid flow to receiver 26. From receiver 26 the liquid ammonia flows through line 30 to a level controlled valve 31 associated with an ethylene condenser 32. The liquid ammonia enters the valve 31 at approximately 150 p. s. i. a., and expands through this valve down to approximately 18 p. s. i. a. This lower pressure is the pressure in the chamber area around the tubes of ethylene condenser 32, which is controlled by the pressure in line 11 referred to at the start of the cycle. The quantity of ammonia pumped by the compressor 10 is so adjusted that the pressure of 18 p. s. i. a. around the tubes of the ethylene condenser 32 is held constant. Thus, by well known physical-chemical laws the temperature of the evaporating ammonia around the tubes of ethylene condenser 32 is held at −21° F. The foregoing represents a closed ammonia system which constitutes the first stage of refrigeration of our system.

The second stage of refrigeration, indicated in its entirety at B, is obtained by liquefying ethylene, ethane, or other refrigerants of that class by compression and expansion steps similar to those described above in connection with the first stage A. The ethylene compressor 35 pumps a gaseous ethylene from intake line 36 at approximately 18 p. s. i. a., the compressor discharging into outlet line 37 at a pressure of approximately 367 p. s. i. a. This high pressure ethylene gas is conducted from line 37 to an after-cooler 38, and thence through line 39 to an oil separator 41, and thence through line 42 to the tubes of the ethylene condenser 32. The ethylene gas entering the tubes of this condenser 32 at approximately 367 p. s. i. a. passes countercurrent to the ammonia gas in the condenser chamber outside the tubes. Within this condenser the ethylene gas is liquefied by means of evaporating ammonia, and the heat released from the ethylene is taken up and carried away by the ammonia. Liquid ethylene leaves the tubes of condenser 32 and flows by way of line 43 to the subcooler 44 and thence through line 45 to a receiver 46, and thence through line 48 to a level controlled valve 49. The liquid ethylene is subcooled in the subcooler 44 by the aforementioned cold gases which enter the subcooler through pipe 21c of the subcooler cooling line 21, these cold gases passing through the chamber area of the subcoler. From the discharge outlet of this chamber area, these cold gases are conducted through the series section 21b of the cooling line 21 to the inlet of subcooler 20. The liquid ethylene is also subcooled in the receiver 46 by the aforementioned cold gases which enter the receiver through pipe 27c of receiver cooling line 27, this line introducing the cold gases flowing into the tubes 46' of the receiver 46. The receiver cooling line continues by way of pipe 27b from the tubes 46' of receiver 46 to the tubes 26' of receiver 26. Uncondensed vapors may be vented from the receiver 46 by means of valve 53, which is connected through pipe 55 and cooling line section 21b with the inlet end of the chamber area of subcooler 20.

Equalizer line 50 from receiver 46 to condenser 32 prevents gas accumulation in receiver 46 which would impede liquid flow to receiver 46.

The ethylene liquid enters the level controlled expansion valve 49 at a pressure of approximately 367 p. s. i. a. The valve 49 is responsive to liquid level in the chamber area of a methane condenser 62, and the discharge side of the valve discharges into this methane condenser at a pressure of approximately 18 p. s. i. a. The chamber area of this methane condenser 62 is connected by line 63 with the chamber area of another methane condenser 64, this latter condenser being connected in turn to the gaseous ethylene line 36 leading to the ethylene compressor 35. The expansion pressure of approximately 18 p. s. i. a. at the outlet side of valve 49 is the pressure which prevails in the chamber areas around the tubes of the methane condensers 62 and 64, this pressure being controlled by the pressure in line 36 which was referred to above at the beginning of the description of the second stage B of refrigeration. The quantity of ethylene pumped by compressor 35 is so adjusted that the pressure of approximately 18 p. s. i. a. is maintained substantially constant around the tubes of the methane condensers 62 and 64. Thus, by well known physical-chemical laws the temperature of the evaporating ethylene is held at substantially −147° F. This latter portion of the system constitutes the closed ethylene system or the second stage of refrigeration B.

Referring now to the third stage of refrigeration, indicated in its entirety at C, this involves liquefying methane, or carbon monoxide, or other refrigerants of that class, in a manner similar to the first and second stages of refrigeration. The methane compressor 70 pumps gaseous methane from line 71 at approximately 18 p. s. i. a. to line 72 at a pressure of approximately 620 p. s. i. a. From line 72 this gaseous methane at high pressure passes through the after-cooler 73 and thence through line 74, oil separator 75 and line 76 to the tubes of the methane condenser 64. Within these tubes of the condenser 64 the methane gas at approximately 620 p. s. i. a. passes countercurrent to the ethylene gas flowing through the chamber area outside the tubes, and impurities which may be present in the methane stream which are more easily condensable than methane are condensed and drained off from the tubes of condenser 64 through line 77 leading to the heavy receiver 78. Leading from the heavy receiver 78 is a discharge line 79 which connects with cooling line section 21c extending to the chamber area of subcooler 44. The flow through line 79 is controlled by a level responsive valve 81 which is controlled by the level in the heavy receiver 78, the collection of the heavier impurities in this receiver 78 opening the valve 81 at a predetermined level and permitting discharge of these heavier impurities down through line 79.

The methane gas leaving the discharge end of the tubes of methane condenser 64 passes through line 83 to the tubes of the other methane condenser 62. The methane gas is liquefied in these tubes by evaporating ethylene in the chamber area of condenser 62 outside of the tubes. Heat released from the methane is taken up and carried away by the ethylene. Liquid methane leaves the tubes of condenser 62 and flows by way of line 84 to the tubes of a subcooler 85. From the discharge end of these subcooler tubes the liquid methane is conducted by way of line 86 to a receiver 88, and thence by way of line 89 to the level controlled valve 91. Within the subcooler 85, the liquid methane is subcooled by cold gases and liquids received over pipe 21d of the subcooler cooling line 21. The discharge from the chamber area of subcooler 85 is through pipe 21c of the subcooler cooling line leading to the chamber area of subcooler 44. Uncondensed vapors may be vented from the receiver 88 by way of vent valve 95 and line 96 which also connects with pipe 21c leading to the subcooler 44.

The methane liquid enters the level controlled expansion valve 91 at a pressure of approximately 620 p. s. i. a., and expands down through this valve to a pressure of approximately 18 p. s. i. a., the latter pressure being the pressure of the chamber area of the natural gas condenser 97. The valve 91 is responsive to the liquid level in this chamber area of condenser 97. This chamber area discharges through line 98 to the chamber area of another natural gas condenser 99. The chamber area of this latter condenser discharges through line 71 to the intake side of the methane compressor 70. The above pressure of approximately 18 p. s. i. a. which is maintained around the tubes in these natural gas condensers 97 and 99 is controlled by the pressure in this line 71 referred to above in the beginning of the description of this third stage. The quantity of methane pumped by the compressor 70 is so adjusted that the pressure of approximately 18 p. s. i. a. around the tubes of condensers 97 and 99 is held substantially constant. Thus, by well known physical chemical laws, the temperature of the evaporating methane is held at approximately −256° F. This latter portion of the apparatus constitutes the closed methane system or third stage of refrigeration.

The above described liquid methane is utilized to effect the condensation of the natural gases or other hydrocarbon constituents of fuel gases by bringing about a countercurrent heat exchange between the two within the natural gas condensers 97 and 99. The natural gas is brought in from its point of supply through line 101, from whence it enters the natural gas compressor 102 or the pressure regulating governor valve 103, by means of appropriate manipulation of valves 104 and 105 as explained below, depending upon the pressure of the gas coming through supply line

101. If the supply pressure is substantially below 100 p. s. i. a., then the supply gas is fed to the compressor 102 for the purpose of having its pressure raised substantially to 100 p. s. i. a. On the other hand, if the gas coming in over the supply line 101 has a pressure substantially in excess of 100 p. s. i. a., then this supply gas is passed through the pressure reducing governor 103 for reducing the pressure down to approximately 100 p. s. i. a. It will be understood that this illustrative or preferred pressure of 100 p. s. i. a. is exemplary of preferred practice according to the present invention, but is not necessarily limitative. When one or more gases of a mixture are to be separated by fractional liquefaction, it has been found that better and sharper separation may be secured at lower pressures. Less of the more volatile constituents of the mixed gas dissolve in the liquids condensed at various stages in the cooling and therefore greater proportions of constituents more volatile than methane may be discharged at the residual vent with smaller attendant losses of the desirable hydrocarbon constituents. For instance, at pressures of approximately 100 p. s. i. a., liquids of high purity representing butane, propane, ethane and methane may be drawn off the various stages of the cooling chamber and stored. The lower the pressure the purer the product becomes. The regulating valve or governor 103 is connected in parallel around the compressor 102, and the gas can be caused to flow through either one of these units by appropriate manipulation of the control valves 104, 105. The gas leaves either the compressor 102 or the governor 103 and passes through line 106 to an aftercooler 107, and thence passes through line 108 to the oil separator 109. From the oil separator the gas passes through line 111 to liquid purifier 112. This liquid type of purifier 112 serves to remove carbon dioxide and other gases which would solidify in the natural gas condensers 97 and 99. From the purifier 112 the gas flows via line 113 to driers 114 and 115 which are connected in parallel through suitable control valves 116. The gas is passed through these driers for the purpose of removing all water vapor therefrom which would otherwise solidify in the tubes of the natural gas condensers 97 and 99. One drier 114 or 115 is in use while the other drier is being reconditioned for use. The gas flows from these driers over line 118 to the inside of the tubes of the natural gas condenser 99, where most of the hydrocarbons of higher molecular weight than ethane are condensed and drained off into the receiver 121 over line 122. As these hydrocarbons collect in the receiver 121, they are allowed to flow from this receiver to the subcooler cooling line 21$d$ under the control of the level controlled valve 123, this valve being reponsive to the level of the hydrocarbons in receiver 121. This is the source of the hydrocarbons of higher molecular weight than ethane which are caused to flow in series through the subcoolers 85, 44 and 20 by way of subcooler cooling line 21, for the purpose of effectively utilizing the low temperatures of these removed hydrocarbons.

From the tubes of the condenser 99 the uncondensed portion of the natural gas stream consisting substantially entirely of methane, ethane and nitrogen, continues over line 124 to the inside of the tubes of the other natural gas condenser 97, where most of the methane and ethane and a major portion of the nitrogen are liquified by evaporating methane from valve 91, as above described. The liquefied methane, ethane and nitrogen leave the tubes of this second condenser 97 over line 125 which extends to receiver 126. Uncondensed nitrogen and other gases are removed substantially entirely at this point, these uncondensed gases leaving the receiver 126 by way of valve 127 and line 21$e$ extending to subcooler cooling line 21$d$. Hence, the low temperatures of the removed nitrogen, other uncondensed gases and methane are effectively utilized for subcooling purposes in the subcoolers 85, 44 and 20 of all three stages of refrigeration. As the liquid methane, ethane and nitrogen are collected in receiver 126 they are released therefrom at substantially 100 p. s. i. a. by way of float controlled valve 129 which controls discharge line 131 and which is responsive to liquid level in the receiver 126. Discharge line 131 conducts the liquefied methane, ethane and nitrogen to flash tank 132. The upper area of this flash tank 132 is connected to section 21$f$ of the subcooler cooling line 21. This pipe 21$f$ thus connects to pipes 21$e$ and 21$d$ extending to methane subcooler 85 and thence on through the series of subcoolers to the regulator 23 which connects with the disposal system pipe line 24. It will hence be seen that the pressure which is established by the governor 23 is transmitted back through the subcooling line 21 and establishes or controls the pressure within the flash tank 132. Assuming that the governor 23 is set to maintain a substantially predetermined pressure of 35 p. s. i. a., this will set the temperature in the flash tank 132 at approximately minus 257° F. where nitrogen and ethane are present in controlled quantities. Changing the pressure in flash tank 132, as by changing the setting of regulator 23, changes the chemical composition of the liquid in flash tank 132 and has a definite effect on the temperature in this flash tank, as can be readily calculated by those skilled in the art.

Gases evolved in the flash tank 132 during the expansion through valve 129 are vented through pipe 21$f$ and pipe 21$d$ to the methane subcooler 85, as before described. These gases, together with the liquids transmitted down through valve 123 exchange heat with the liquid methane in the methane subcooler 85, and thereafter they proceed over subcooler cooling line 21 to the ethylene subcooler 44 and to the ammonia subcooler 20 where heat exchange takes place in each of the refrigeration stages. This cooling medium, passing through the subcooler cooling line 21, then proceeds through governor 23 to the disposal pipe line 24. The afore-mentioned process control is obtained by giving different settings to the governor 23.

Liquefied gas, consisting substantially entirely of methane and a minor proportion of ethane and nitrogen, leaves the flash tank 132 by way of line 134 under the control of level controlled valve 135 which is responsive to liquid level within the flash tank. The liquefied gases expand through valve 135 from a pressure of approximately 35 p. s. i. a. down to a pressure of approximately 18 p. s. i. a., a pressure slightly higher than atmospheric. Gases evolved during the expansion through valve 135, together with the liquified gases, proceed over line 134 to the insulated storage holder diagrammatically indicated at 136. The liquids remain for storage in this heavily insulated vessel while gases proceed by way of line 27$c$ to the cooling tubes 46' of ethylene receiver 46. The line or pipe 27$c$ is part of the receiver cooling line 27 which connects through the tubes 46' to pipe section 27b which the cooling tubes 26' of the ammonia receiver 26. From the latter tubes 26' the receiver cooling line 27 continues by way of pipe 27a to the disposal system 24. Thus, these gases proceeding from the storage holder 136 over receiver cooling line 27 effect a subcooling function in the ethylene stage and in the ammonia stage of the refrigerating system. The slow evaporation occurring in the storage holder 136 between periods of liquefaction, because of heat infiltration into the storage holder, continually produces quantities of cold methane and nitrogen gases at a temperature of approximately minus 260° F. As above stated, this gas passes through the cooling tubes of the ethylene receiver 46 and the ammonia receiver 26. The refrigeration which is thereby obtained from these low temperature gases is used to keep the operating stock of ammonia and ethylene in liquid condition at low enough pressures for safe storage while the refrigerating compressors are shut down.

With reference to the methane employed in the third stage of refrigeration C, the supply of methane for the initial starting of this stage can be obtained through valve 117 from line 118 to line 71. After a supply of liquid natural gas is established in the storage holder, a preferred supply of methane may be obtained from line 27C through line 90 and valve 110 and delivered to line 71.

Referring now to the regasification cycle, let us assume that there has been a breakage in the main supply line leading from the gas field or other temporary failure of normal supply, and that it is desired to regasify all or part of the liquid substitute fuel in the storage holder 136. This is accomplished by drawing liquid from the holder through link 138 by means of pump 140. This pump raises the pressure on the liquid slightly higher than the gas pressure in the distribution system, such distribution system being represented by the pipe line 142. Under the higher pressure created by the pump 140 the liquid passes up into the tubes of the re-heater 144. The tubes of this re-heater or regasifier are surrounded by steam confined within an enclosing steam chest. The steam enters through a thermostatically controlled steam valve 146 which has its control bulb located in the outlet gas line 142. The condensate from the steam is removed automatically through trap valve 148 interposed in discharge line 149. Thus, the liquid gas is pumped from the storage holder 136 by pump 140 and is evaporated into the gaseous phase by the heat interchange occurring in the regasifier 144. This regasifing cycle or operation can be performed very rapidly for emergency situations.

Diluent gases required for proper utilization may be pumped into line 142 from diluent supply line 152 by means of compressor 153 via discharge line 154 and controller 155. Controller 155 may be one of several proportioning devices well known to the gas industry and is used to control the desired amount of diluent.

While we have illustrated and described what we regard to be the preferred method and the preferred apparatus for carrying our invention into effect, nevertheless it will be understood that such are merely exemplary, and that numerous modifications and rearrangements may be made therein without departing from the essence of the invention.

We claim:

1. In apparatus of the class described, the combination of a plurality of stages of refrigeration connected in cascade, a subcooler in each stage, means in the low temperature stage of refrigeration for removing the hydrocarbons of higher molecular weight than ethane from the natural gas by liquefaction, and means for passing these hydrocarbons of higher molecular weight than ethane back through said subcoolers in a direction from the lower temperature stage to the higher temperature stage.

2. The method of processing natural gas, consisting largely of methane and containing a substantial proportion of nitrogen and a substantial proportion of hydrocarbons of higher molecular weight than ethane, so as to provide a body of liquefied gas consisting substantially entirely of a major proportion of methane and a minor proportion of ethane, said body of liquefied gas being adapted for long period storage at low temperatures and at pressures only slightly in excess of atmospheric so as to be available for use as an emergency fuel upon regasification, which method comprises, passing said natural gas through a series of progressively cooler refrigeration zones, initially liquefying all hydrocarbons of higher molecular weight than ethane in the first of said refrigeration zones, separating said initially liquefied hydrocarbons, liquefying substantially all of the methane and ethane in said uncondensed portion together with a portion of the nitrogen, separating the uncondensed nitrogen and any uncondensed methane from the liquefied mixture of methane, ethane and nitrogen, removing said liquefied nitrogen by a flash pressure reduction, separating the regasified nitrogen from the remaining liquid, and passing said initially liquefied hydrocarbons of higher molecular weight than ethane in heat exchange relationship in a counter direction through said series of refrigerated zones.

3. The method of processing natural gas, containing at least about 80% of methane, at least about 9.5% of nitrogen, and at least about 5% of hydrocarbons of higher molecular weight than ethane, so as to provide a body of liquefied gas consisting substantially entirely of a major proportion of methane and a minor proportion of ethane, said body of liquefied gas being adapted for long period storage at low temperatures and at pressures only slightly in excess of atmospheric so as to be available for use as an emergency fuel upon regasification, which method comprises, passing said natural gas through a series of progressively cooler refrigeration zones, initially liquefying all hydrocarbons of higher molecular weight than ethane in the first of said refrigeration zones, separating said initially liquefied hydrocarbons, liquefying substantially all of the methane and ethane in said uncondensed portion together with a portion of the nitrogen, separating the uncondensed nitrogen and any uncondensed methane from the liquefied mixture of methane, ethane and nitrogen, removing said liquefied nitrogen by a flash pressure reduction, separating the regasified nitrogen from the remaining liquid, and passing said initially liquefied hydrocarbons of higher molecular weight than ethane in heat exchange relationship in a counter direction through said series of refrigerated zones.

4. In apparatus of the class described, the combination of a plurality of stages of refrigeration connected in cascade, a subcooler in each stage, means in the low temperature stage of refrigeration for condensing hydrocarbons in the natural gas of higher molecular weight than ethane, and means for passing these hydrocarbons of higher molecular weight than ethane back through said sub-coolers in a direction from the lower temperature stage to the higher temperature stage.

PAUL L. BORN.
DANIEL V. MEILLER.

REFERENCES CITED

The following references are of record in the file of this patent:

UNITED STATES PATENTS

| Number | Name | Date |
|---|---|---|
| 668,197 | Le Sueur | Feb. 19, 1901 |
| 1,912,044 | Schmidt | May 30, 1933 |
| 1,933,641 | Schmidt | Nov. 7, 1933 |
| 1,963,922 | Robinson | June 19, 1934 |
| 2,065,429 | Clapp | Dec. 22, 1936 |
| 2,082,189 | Twomey | June 1, 1937 |
| 2,090,163 | Twomey | Aug. 17, 1937 |
| 2,180,435 | Schlitt | Nov. 21, 1939 |
| 2,265,527 | Hill | Dec. 9, 1941 |

OTHER REFERENCES

"The Liquefaction and Storage of Natural Gas to Date," presented at the 30th Annual Meeting in Washington, May 12 and May 13, 1941, of the American Institute of Refrigeration. See pages 163 through 176. Pages 167, 168, 170 through 175 especially relied upon.

The Separation of Gases by Ruhemann, reprinted by the Oxford University Press in 1945. Page 253 relied upon.